United States Patent
Kim et al.

(10) Patent No.: US 12,078,352 B2
(45) Date of Patent: Sep. 3, 2024

(54) COMBUSTOR

(71) Applicant: HANWHA AEROSPACE CO., LTD., Changwon-si (KR)

(72) Inventors: Shaun Kim, Changwon-si (KR); Su Hyeong Cho, Suwon-si (KR); Ju Pyoung Kim, Changwon-si (KR)

(73) Assignee: HANWHA AEROSPACE CO., LTD., Changwon-si (KR)

( * ) Notice: Subject to any disclaimer, the term of this patent is extended or adjusted under 35 U.S.C. 154(b) by 0 days.

(21) Appl. No.: 17/738,401

(22) Filed: May 6, 2022

(65) Prior Publication Data

US 2023/0204212 A1 Jun. 29, 2023

(30) Foreign Application Priority Data

Dec. 29, 2021 (KR) .................. 10-2021-0191801

(51) Int. Cl.
*F23R 3/06* (2006.01)
*F23R 3/16* (2006.01)
*B33Y 80/00* (2015.01)

(52) U.S. Cl.
CPC .................. *F23R 3/06* (2013.01); *F23R 3/16* (2013.01); *B33Y 80/00* (2014.12); *F23R 2900/00018* (2013.01)

(58) Field of Classification Search
CPC .... F23R 3/04; F23R 3/045; F23R 3/06; F23R 3/16; F23R 3/38; F23R 2900/03041
See application file for complete search history.

(56) References Cited

U.S. PATENT DOCUMENTS

| | | | | |
|---|---|---|---|---|
| 3,820,324 | A | * 6/1974 | Grindley | F23R 3/04 60/738 |
| 9,016,067 | B2 | * 4/2015 | Gerendas | F23R 3/06 60/757 |
| 10,094,564 | B2 | 10/2018 | Lebel | |
| 10,648,673 | B2 | * 5/2020 | Kim | F23R 3/44 |
| 2018/0356099 | A1 | * 12/2018 | Zelina | F23R 3/286 |
| 2019/0024895 | A1 | * 1/2019 | Stickles | F23R 3/045 |
| 2021/0310655 | A1 | * 10/2021 | Graves | F23R 3/002 |

FOREIGN PATENT DOCUMENTS

| | | | | |
|---|---|---|---|---|
| DE | 10214574 | A1 * | 10/2003 | ............. F23R 3/045 |
| GB | 819065 | A * | 8/1959 | ............. F23R 3/045 |

* cited by examiner

*Primary Examiner* — Todd E Manahan
*Assistant Examiner* — Sean V Meiller
(74) *Attorney, Agent, or Firm* — Sughrue Mion, PLLC

(57) ABSTRACT

A combustor includes: a combustor case; a combustor liner which is arranged in the combustor case and into which fuel is injected; and an air guide unit that is hollow and is formed to protrude from an inner surface of the combustor liner to inject air into an inside of the combustor liner, wherein the air guide unit includes: a first portion forming one end of the air guide unit and coupled to the inner surface of the combustor liner; and a second portion forming another end of the air guide unit and disposed in the combustor liner, and a size of the first portion is different from a size of the second portion.

14 Claims, 5 Drawing Sheets

COMBUSTOR

CROSS-REFERENCE TO RELATED APPLICATION

This application is based on and claims priority from Korean Patent Application No. 10-2021-0191801, filed on Dec. 29, 2021, in the Korean Intellectual Property Office, the disclosure of which is incorporated herein in its entirety by reference.

BACKGROUND

1. Field

Example embodiments of the disclosure relate to an air injector arranged in a combustor liner.

2. Description of the Related Art

In the case of a small turbojet engine, it is easy to reduce manufacturing costs, and a slinger based on a high rotation speed of a shaft and a combustor based on a rotary-type fuel injection device are used to inject fuel.

A combustor of the related art is designed in such a way that it is to be manufactured by perforating a liner made of a roll-bent sheet metal material and welding tube-shaped liner parts together. This method may require perforating and welding each tubular liner, thus, complicating a manufacturing process for a combustor liner. Also, the risk of thermal damage to the liner may increase because a welded portion in the tube is more likely to be directly exposed to a high-temperature flame.

Also, in the case of most turbojet engines based on slinger combustors, a deswirler or the like may be omitted, and thus, the swirl angle of air introduced from a compressor may be large. In most engines, because the rotation component of air introduced into a combustor is about 10 degrees but it is about 15 degrees or more in the case of a slinger combustor, the slinger combustor may be disadvantageous over other combustors in terms of pressure loss and flow structure.

Thus, as air is introduced into a liner of the combustor through a vertical air hole, the rotation component of air introduced into the liner may be canceled, the air introduced into the liner may be again expanded by reacting with fuel that is sprayed while rotating, and a rotation component thereof may be again added through a turbine vane nozzle to match the rotation direction of a turbine blade. In this case, it may be necessary to minimize the pressure loss occurring between the rotation component of air introduced from a compressor and the rotation component in the direction of a turbine vane.

SUMMARY

Various example embodiments provide a combustor in which a combustor liner may be more easily manufactured with high performance and combustion performance may be improved by minimizing a pressure loss of air introduced into the combustor liner.

According to example embodiments, a combustor case; a combustor liner which is arranged in the combustor case and into which fuel is injected; and an air guide unit that is hollow and is formed to protrude from an inner surface of the combustor liner to inject air into an inside of the combustor liner, wherein the air guide unit includes: a first portion forming one end of the air guide unit and coupled to the inner surface of the combustor liner; and a second portion forming another end of the air guide unit and disposed in the combustor liner, and a size of the first portion is different from a size of the second portion.

The air guide unit may further include: a third portion arranged at an inlet side of the air, and formed inclined with respect to the inner surface of the combustor liner; and a fourth portion arranged at an outlet side of the air, and formed perpendicular to the inner surface of the combustor liner.

A second flow port and a third flow port may be arranged in the third portion.

The second flow port may be formed as a plurality of holes at a position closer to the inner surface of the combustor liner than the third flow port.

The third flow port may be formed in a crescent shape along a circumference of the air guide unit.

A fourth flow port may be arranged in the fourth portion, and the fourth flow port may be formed as a plurality of holes.

A first flow port may be arranged in the second portion.

The air guide unit may inject air having passed through a deswirler, into the combustor liner.

In the air guide unit, the first portion may be formed in an elliptical shape, and the second portion may be formed in a circular shape.

In the air guide unit, a long diameter of the first portion may be greater than a diameter of the second portion.

In the air guide unit, the second portion may be arranged biased in a main flow direction of a combustion gas in the combustor liner with respect to the first portion.

The combustor liner and the air guide unit coupled to the combustor liner may be manufactured by stacking combustor liner parts output by a three-dimensional (3D) printer.

The first portion and the second portion may be formed in a waterdrop shape, the air guide unit may further include: a third portion arranged at an inlet side of the air, and formed inclined with respect to the inner surface of the combustor liner; and a fourth portion arranged at an outlet side of the air, and formed perpendicular to the inner surface of the combustor liner, and a pointed portion may be formed in the fourth portion.

Other aspects, features, and advantages other than those described above will become apparent from the following detailed description, the appended claims, and the accompanying drawings.

BRIEF DESCRIPTION OF DRAWINGS

The above and other aspects, features, and advantages of the embodiments of the disclosure will be more apparent from the following description taken in conjunction with the accompanying drawings, in which.

DETAILED DESCRIPTION OF EXAMPLE EMBODIMENTS

Figure 1A:
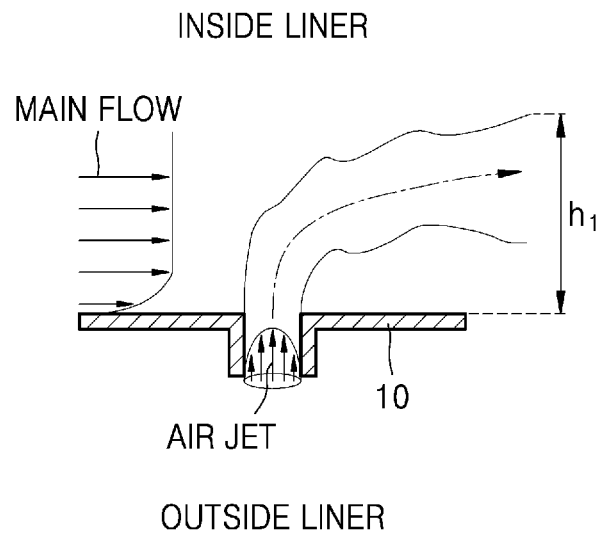
FIGS. 1A and 1B illustrate a main flow direction in which air reacted with fuel in a combustor liner is discharged to a vane and a degree to which an air jet introduced into the combustor liner penetrates into a combustor, depending on whether there is an air guide unit, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items.

The disclosure may include various embodiments and modifications, and certain embodiments thereof are illustrated in the drawings and will be described herein in detail. However, this is not intended to limit the disclosure to particular embodiments, and it should be understood as including all modifications, equivalents, and substitutes included in the spirit and scope of the disclosure. As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that although terms such as "first" and "second" may be used herein to describe various elements, these elements should not be limited by these terms and these terms are only used to distinguish one element from another element.

As used herein, the singular forms "a", "an", and "the" are intended to include the plural forms as well, unless the context clearly indicates otherwise.

Also, it will be understood that the terms "comprise," "include," and "have" used herein specify the presence of stated features or elements, but do not preclude the presence or addition of one or more other features or elements.

Sizes of elements in the drawings may be exaggerated for convenience of description. In other words, because the sizes and shapes of components in the drawings are arbitrarily illustrated for convenience of description, the disclosure is not limited thereto.

The x axis, the y axis, and the z axis are not limited to three axes of the rectangular coordinate system and may be interpreted in a broader sense. For example, the x-axis, y-axis, and z-axis may be perpendicular to each other or may refer to different directions that are not perpendicular to each other.

When a certain embodiment may be implemented differently, a particular process order may be performed differently from the described order. For example, two processes described in succession may be performed substantially at the same time or may be performed in an order opposite to the described order.

The terminology used herein is for the purpose of describing particular embodiments only and is not intended to limit the disclosure. It will be understood that terms such as "comprise", "include", and "have", when used herein, specify the presence of stated features, integers, steps, operations, elements, components, or combinations thereof, but do not preclude the presence or addition of one or more other features, integers, steps, operations, elements, components, or combinations thereof.

Hereinafter, a combustor according to an embodiment will be described with reference to FIGS. 1A and 1B to 4.

Figure 1B:
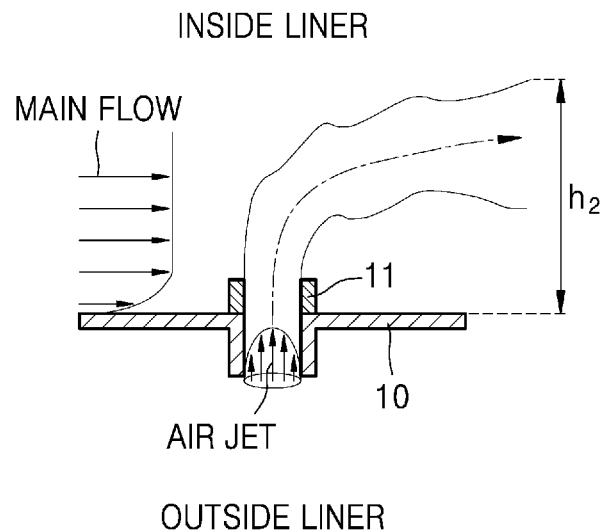
Figure 2:
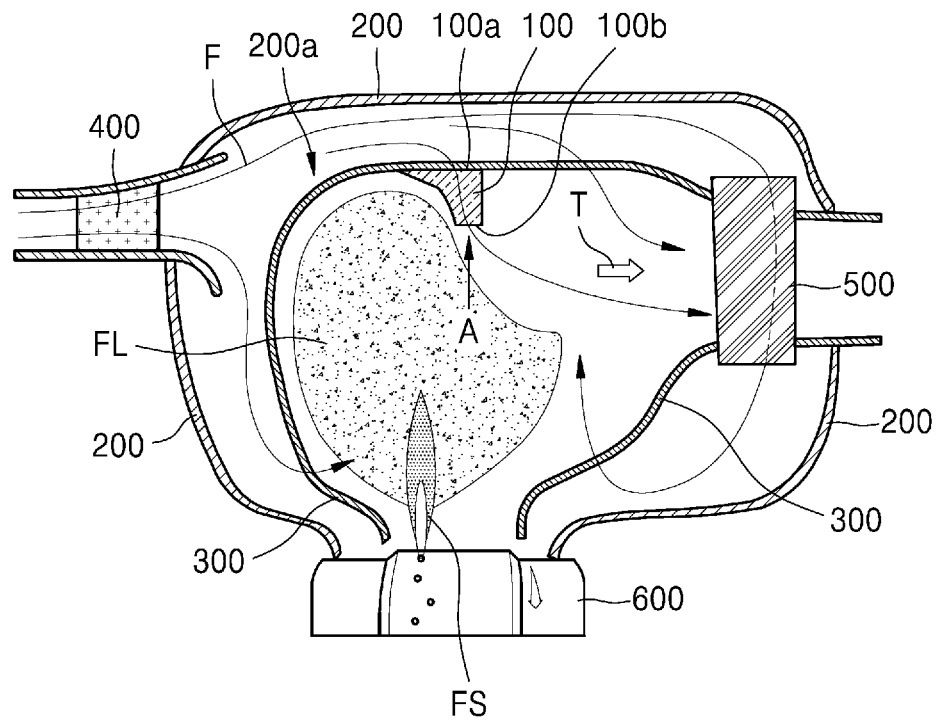
FIG. 2 illustrates a structure of a combustor according to an embodiment.
Figure 3:
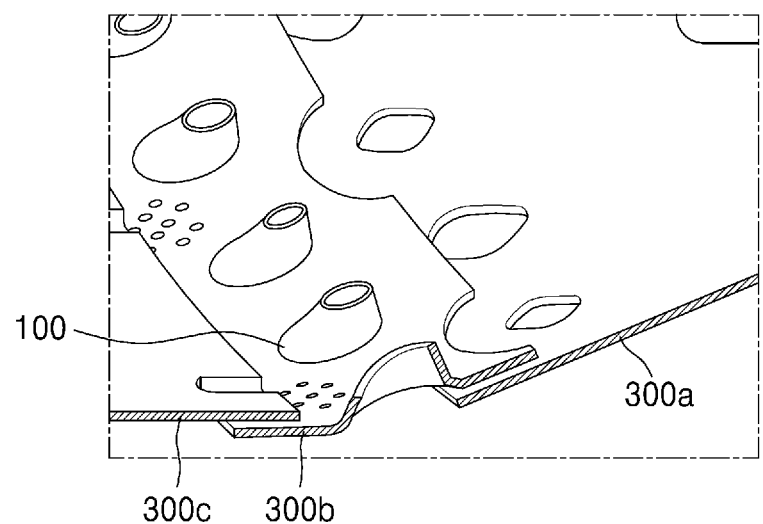
FIG. 3 is a perspective view of region A of FIG. 2.
Figure 4:
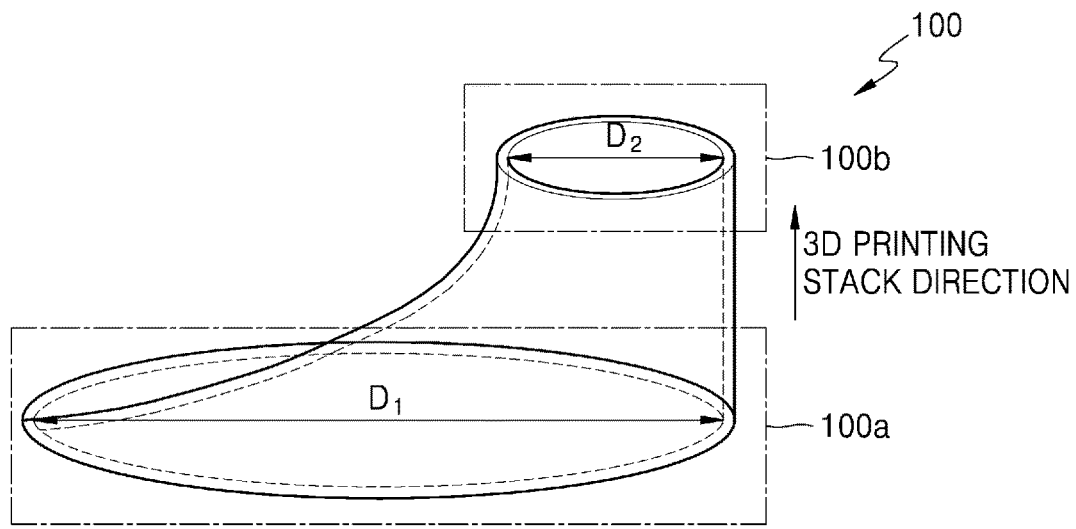
FIG. 4 illustrates a shape of an air guide unit according to an embodiment.

FIGS. 1A and 1B illustrate a main flow direction in which air reacted with fuel in a combustor liner is discharged to a vane and a degree to which an air jet introduced into the combustor liner penetrates into a combustor, depending on whether there is an air guide unit, according to an embodiment. FIG. 2 illustrates a structure of a combustor according to an embodiment. FIG. 3 is a perspective view of region A of FIG. 2. FIG. 4 illustrates a shape of an air guide unit according to an embodiment.

Referring to FIGS. 1A and 1B to 4, a combustor according to an embodiment may include a combustor case 200, a combustor liner 300 which is arranged in the combustor case 200 and in which fuel is injected, and an air guide unit 100 that is hollow and is formed to protrude from an inner surface of the combustor liner 300 into the inside of the combustor liner 300 to inject air into the inside of the combustor liner 300.

In this case, the air guide unit 100 may include a first portion 100a forming one end of the air guide unit 100 and coupled to the inner surface of the combustor liner 300, and a second portion 100b forming another end of the air guide unit 100 and disposed in the combustor liner 300, and the size of the first portion 100a is different from the size of the second portion 100b. In more detail, the first portion 100a may have a greater internal area than the second portion 100b.

FIGS. 1A and 1B show a jet-in-crossflow (JICF) that is the shape of a flow injected in a direction perpendicular to the direction of a main flow. FIGS. 1A and 1B illustrates a state in which a main flow proceeds in a liner 10 in a direction in which a vane is located and a state in which an air jet penetrates more deeply into the liner 10 through an air guide unit 11 formed in FIG. 1B, than when there is no air guide unit as in FIG. 1A.

Referring to FIGS. 1A and 1B, the JICF may be used in a combustor design in various forms. For example, the inner surface of a liner may be protected from high-temperature air through an effusion hole disposed adjacent to the inner surface of the liner, and an equivalent ratio suitable for the internal space of a combustor may be formed through a dilution hole to determine the flame temperature in a combustion chamber. The most representative design parameter of the JICF may be a momentum ratio J as represented in the following equation.

$$J = rho_{jet} \times u_{jet}^2 / rho_\infty \times u_\infty^2$$

Here, "rho" and "u" denote the concentration and speed of a fluid, and "jet" and "∞" denote jet air and a main flow (crossflow), respectively.

In this case, the height at which the jet air penetrates into the main flow may increase as the momentum ratio J increases.

In the case of a small turbojet engine, an air guide unit 11 for increasing the penetration height may be added to separate the space in a combustion chamber as a flow structure.

That is, a penetration height h2 of the jet air penetrating into the liner 10 in the case where the air guide unit 11 is added to the liner 10 as in the present embodiment as illustrated in FIG. 1B may be greater than a penetration height h1 of the jet air in the case where there is no air guide unit 11 as in FIG. 1A.

Referring to FIG. 2, in the combustor according to the embodiment, high-pressure air supplied from a compressor (not illustrated) may flow through a deswirler 400 into the space between the combustor case 200 and the combustor liner 300. The air flowing into the space between the combustor case 200 and the combustor liner 300 may be supplied into the combustor liner 300 through the air guide unit 100.

A flame FL may generated in the combustor liner 300 through a fuel spray FS injected from a slinger nozzle 600 that is rotating, and the air combusted in the combustor liner 300 as such may be discharged to a turbine (not illustrated) through a vane 500. In this case, the combusted air in the combustor liner 300 may flow in a direction in which the vane 500 is disposed, and the direction may be defined as a main flow direction T in the combustor liner 300.

In this case, the air supplied through the air guide unit 100 according to the present embodiment may be improved in the combustion efficiency due to an increase in the penetration height into the combustor liner 300, compared to the air simply introduced into the combustor liner 300 through a perforated portion thereof. Such an increase in the combustion efficiency may be maximized by a particular shape of the air guide unit 100 according to the present embodiment. The particular shape of the air guide unit 100 will be described below.

Referring to FIG. 3, the combustor liner 300 and the air guide unit 100 coupled to the combustor liner 300 may be manufactured by stacking combustor liner parts 300a, 300b, and 300c output by a three-dimensional (3D) printer.

Referring to FIG. 4, the air guide unit 100 according to the present embodiment may be easily manufactured by stacking 3D printing materials from the first portion 100a to the second portion 100b in a 3D printing stack direction. That is, the air guide unit 100 according to the present embodiment may be an air guide structure capable of being manufactured by taking advantage of a 3D printing technique, and may be manufactured by stacking (contouring) from the first portion 100a, which is an elliptical base, to the second portion 100b, which is a circular upper end, at an angle in which the flow of air inside and outside the combustor liner 300 and the rotation direction thereof are considered. When a 3D printed product has a portion bent at 90° in the stacking direction, postprocessing may be essentially required (e.g., a support and the like should be stacked together), and thus, manufacturing based on 3D printing may be difficult.

Also, the combustor liner 300 may be easily manufactured without the need for postprocessing by using an additive manufacturing process of 3D printing to stack a plurality of combustor liner parts 300a, 300b, and 300c forming the inner surface of the combustor liner 300, and thus, combustor liners may be manufactured more efficiently and at lower costs, compared to the manufacturing technology of the related art in which combustor liner parts are welded one by one.

Hereinafter, a structure for forming an air guide unit according to an embodiment will be described in more detail with reference to FIGS. 4 to 7. For the contents not illustrated in FIGS. 4 to 7, reference may be made to the description of FIGS. 1 to 3.

Figure 5:
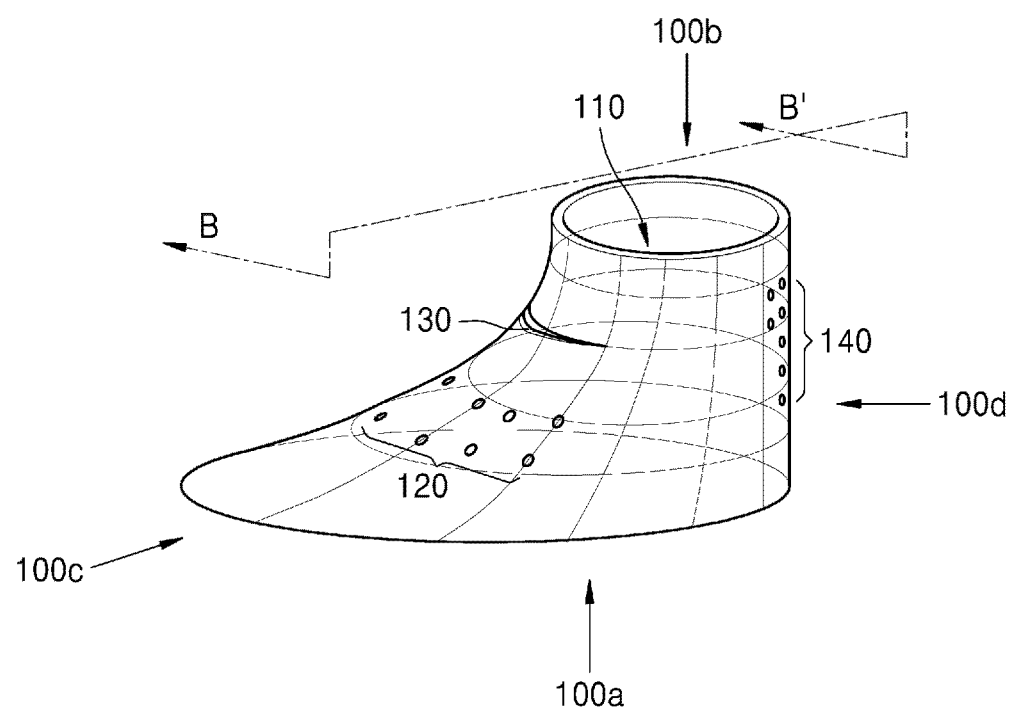
FIG. 5 illustrates flow ports formed in an air guide unit according to an embodiment.
Figure 6:
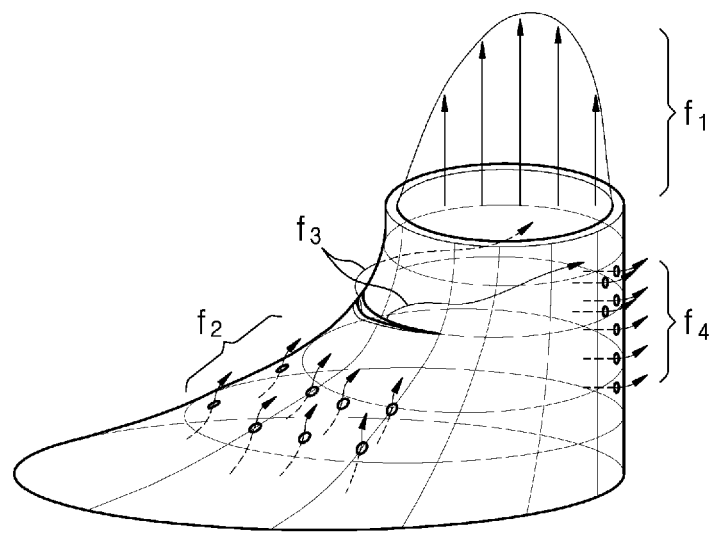
FIG. 6 illustrates flow directions of air flowing from flow ports formed in an air guide unit according to an embodiment.
Figure 7:
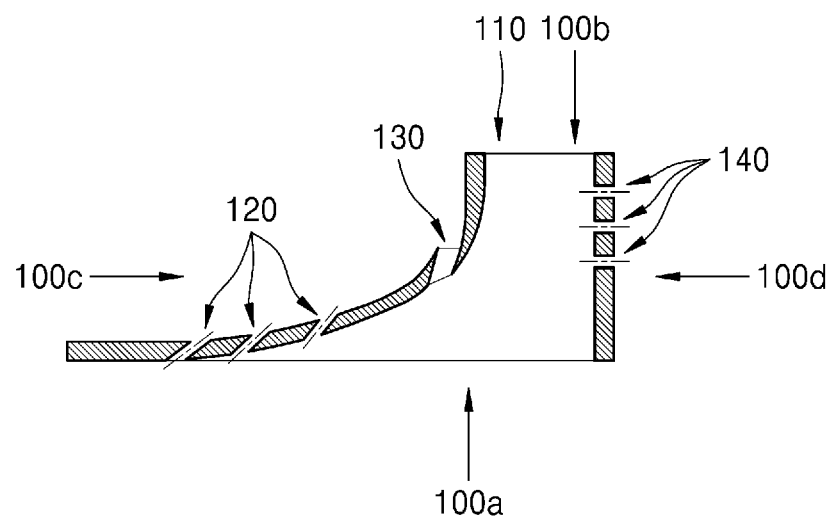
FIG. 7 is a cross-sectional view taken along line B-B' of FIG. 5.

FIG. 5 illustrates flow ports formed in an air guide unit according to an embodiment. FIG. 6 illustrates flow directions of air flowing from flow ports formed in an air guide unit according to an embodiment. FIG. 7 is a cross-sectional view taken along line B-B' of FIG. 5.

Referring to FIGS. 4 to 7, in the air guide unit 100 according to an embodiment, the first portion 100a may be formed in an elliptical shape, and the second portion 100b may be formed in a circular shape. In this case, a long diameter D1 of the first portion 100a may be greater than a diameter D2 of the second portion 100b. The size of a hollow portion of the first portion 100a coupled to the inner surface of the combustor liner 300 may be greater than the size of a hollow portion of the second portion 100b arranged in the combustor liner 300. Thus, the air having passed through the deswirler 400 may more easily enter into the combustor liner 300 through the first portion 100a having the relatively greater size.

The second portion 100b, which is a portion through which air is discharged from the air guide unit 100, may be formed in a direction in which the vane 500 is disposed. That is, the air guide unit 100 may be formed in an asymmetric shape, and the second portion 100b may be arranged in the main flow direction T of the combustor liner 300 with respect to the first portion 100a. Accordingly, when air outside the combustor liner 300 enters into the combustor liner 300, because the air may enter in a direction capable of meeting the main flow direction T in the combustor liner 300, the pressure loss due to the collision between the air entering into the combustor liner 300 and the main flow in the combustor liner 300 may be minimized.

According to the present embodiment, the air guide unit 100 may include a third portion 100c arranged at an inlet side of the air and formed inclined with respect to the inner surface of the combustor liner 300 and a fourth portion 100d arranged at an outlet side of the air and formed perpendicular to the inner surface of the combustor liner 300.

The third portion 100c may be referred to as windward. The third portion 100c may be formed inclined with respect to the inner surface of the combustor liner 300 to function as a guide for allowing the air located outside the combustor liner 300 to naturally enter into the air guide unit 100 to meet in the main flow direction T of the combustor liner 300. The upward inclination may be formed in the main flow direction T around a portion where the inner surface of the combustor liner 300 and the third portion 100c meet each other.

The fourth portion 100d may be referred to as leeward. The fourth portion 100d may be formed perpendicular to the inner surface of the combustor liner 300, and in the introduction direction of the air introduced into the air guide unit 100, it may be formed at a 90-degree angle with respect to the inner surface of the combustor liner 300 such that the air discharged from the air guide unit 100 may not be bent.

Referring to FIGS. 5 and 6, a first flow port 110 may be arranged at the second portion 100b. Referring to FIG. 6, a first flow f1 may be formed from the first flow port 110. The first flow port 110 may be a main flow port of the air guide unit 100, and may allow the air outside the combustor liner 300 to penetrate deeply into the combustor liner 300 through a protrusion structure of the air guide unit 100.

In the third portion 100c formed to be gently inclined, a second flow port 120 formed closer to the inner surface of the combustor liner 300 than a third flow port 130 may be formed as a plurality of holes. Referring to FIG. 6, a second flow f2 may be formed from the second flow port 120.

The plurality of holes forming the second flow port 120 may be windward effusion holes, and may perform a cooling function by supplying air along the surface of the air guide unit of the third portion 100c formed to be gently inclined such that the inner surfaces of the air guide unit 100 and the combustor liner 300 may be protected from the high-temperature internal air. As such, when air is supplied along the surfaces of the combustor liner 300 and the air guide unit 100, a layer cooling flow may be formed and thus a cooling layer may be formed at a surface portion of the combustor liner 300 and the air guide unit 100.

In the third portion 100c formed to be gently inclined, the third flow port 130 formed closer to the second portion 100b, which is an end portion of the air guide unit 100, than the second flow port 120 may be formed in a crescent-shaped slit structure along the circumference of the air guide unit 100.

In order to allow more cooling air to be introduced into the second portion 100b to protect the end portion of the air guide unit 100, that is, the second portion 100b, from the flame FL, the third flow port 130 may be opened with a greater area than the sum of the plurality of holes of the second flow port 120, and both end portions of the second flow port 120 may be formed to face the second portion 100b. The plurality holes of the second flow port 0 may be inclined in the direction of the second portion 100b so that cooling air can be directed to the second portion 100b.

A fourth flow port 140 formed as a plurality of holes may be arranged in the fourth portion 100d that is vertically formed. Because the fourth portion 100d is formed in a cylindrical lateral shape formed perpendicular to the inner surface of the combustor liner 300, and thus, the high-temperature gas in the combustor liner 300 and the fourth portion 100d of the air guide unit 100 act as a non-streamlined object, that is, a bluff body, and a wake is formed at a portion where the fourth portion 100d is disposed and accordingly a high-temperature area is formed, the fourth flow port 140 for cooling the high-temperature area may be formed as a plurality of holes in the fourth portion 100d.

As such, the first flow port 110 may function as an air effusion hole to minimize the pressure loss of the air injected into the combustor liner 300 and improve the combustion efficiency thereof, and the second, third, and fourth flow ports 120, 130, and 140 may function as an air dilution hole to protect the surface portion of the combustor liner 300 and the air guide unit 100 from the high-temperature flame, thus providing an effect of improving the durability of the combustor.

Figure 8:
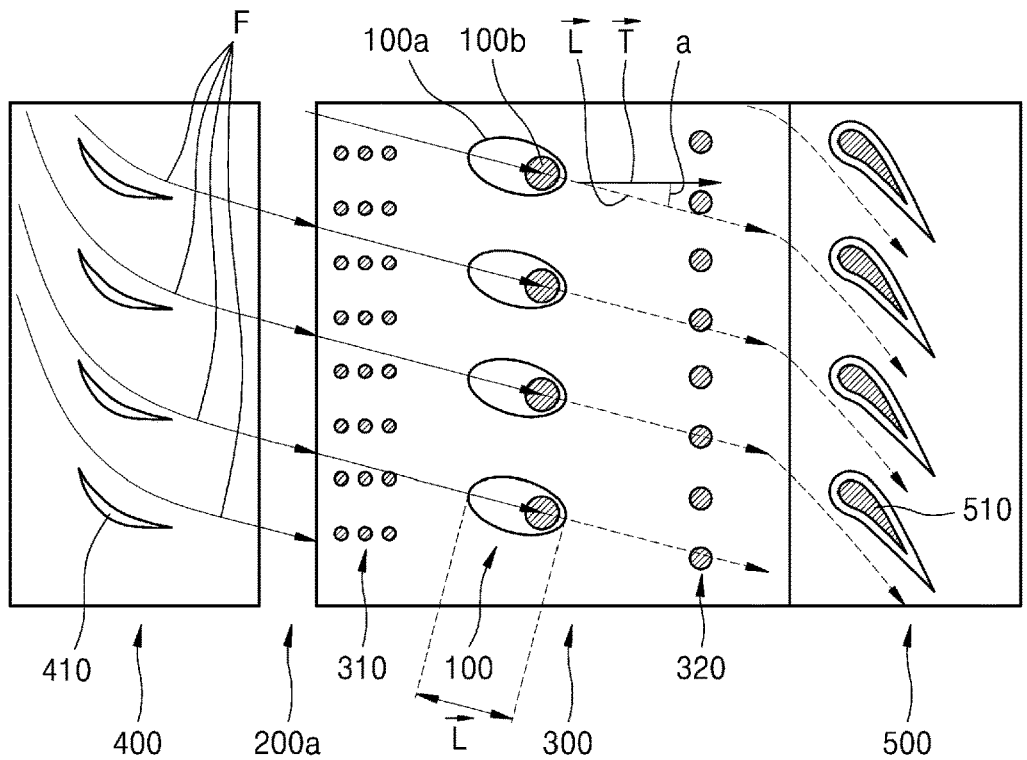
FIG. 8 illustrates a direction in which air flows according to the structure of a combustor liner and an air guide unit according to an embodiment.

FIG. 8 corresponds to region A of FIG. 2 and illustrates a direction in which air flows according to the structure of a combustor liner and an air guide unit according to an embodiment.

Referring to FIG. 8, the air (F) having passed between banana-shaped protrusion portions 410 of the deswirler 400 may enter the combustor liner 300 through a space 200a between the combustor case 200 and the combustor liner 300. In this case, air may flow in a long-axis direction L of an ellipse formed by the first portion 100a of the air guide unit 100 and may enter into the combustor liner 300. Also, the air having entered into the combustor liner 300 may not completely follow the main flow direction T in the combustor liner 300 but may flow in the long-axis direction L of the air guide unit 100 and enter into the space between protrusion portions 510 of the vane 500 after passing by the first hole 310 and the second hole 320. In this case, the longitudinal direction of the protrusion portions 510 of the vane 500, that is, an inclination angle, may be formed to follow a flow direction, which is the longitudinal direction of the air guide unit 100, having an angle "a" with respect to the main flow direction T. According to an embodiment, the longitudinal direction of the protrusion portions 510 may be greater than the angel "a" and smaller than 90°.

As such, the air having passed through the air guide unit 100 through the arrangement structure of the air guide unit 100 may not completely follow the main flow direction T but may flow in a direction parallel to the long-axis direction L of the air guide unit 100. As an experimental example, in this case, an air flow direction angle "a" may be formed at about 12 degrees with respect to the main flow direction T.

As such, because the air guide unit 100 is arranged to be inclined by an angle "a" with respect to the main flow direction T, and the longitudinal direction of the air guide unit 100 arranged to be inclined is arranged to follow the longitudinal direction of the protrusion portions 510 of the vane 500 and accordingly the air flowing through the air guide unit 100 flows in accordance with the guide direction of the air guide unit 100 and naturally flows through the space between the protrusion portions 510 guided by the protrusion portions 510 of the vane 500, the pressure loss of the air discharged to the vane 500 after entering the combustor liner 300 may be minimized.

Also, the air guide unit 100 may be arranged in a direction in which the air introduced into the combustor liner 300 according to the rotation direction of the slinger nozzle 600 may be discharged to the vane 500 while minimizing the pressure loss thereof.

As such, when the flow direction is formed to be inclined with respect to the main flow direction T, and thus, there is a rotation component in the flow of air, there may be an effect of increasing the residence time for the combustion gas to stay in the same volume of the combustor liner. This may be connected to the effect of improving the combustion efficiency.

Hereinafter, an air guide unit according to another embodiment will be described with reference to FIG. 9. For the contents not described below, reference may be made to the contents described above.

Figure 9:
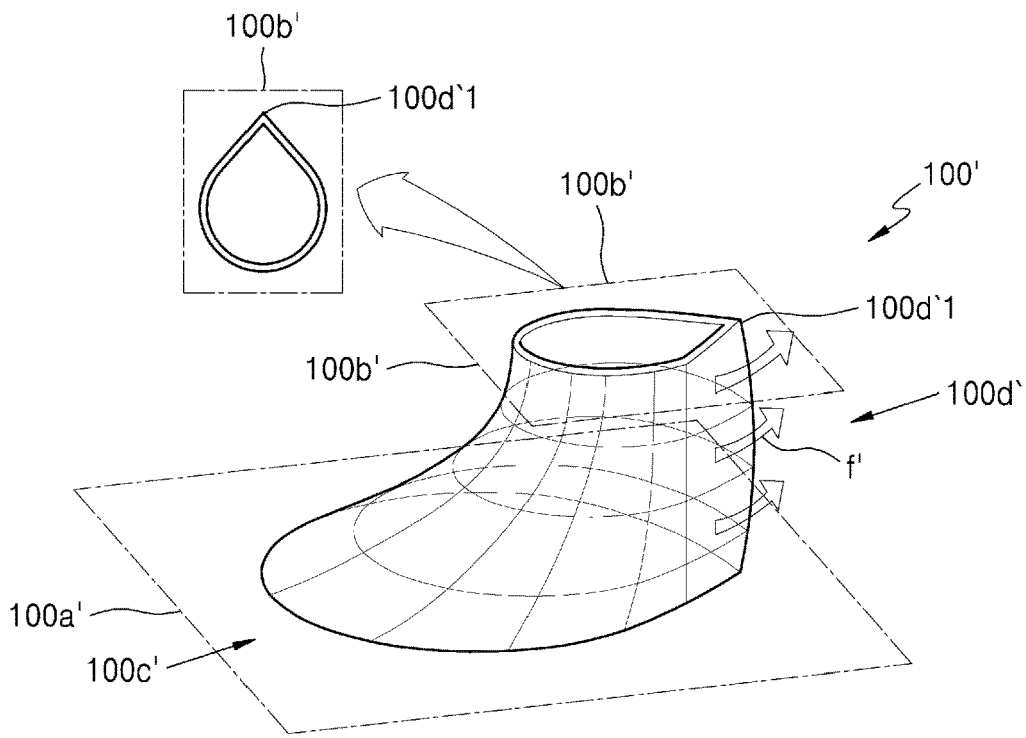
FIG. 9 illustrates an air guide unit according to another embodiment.

FIG. 9 illustrates an air guide unit according to another embodiment.

Referring to FIG. 9, in an air guide unit 100' according to another embodiment, a first portion 100a' and a second portion 100b' may be formed in a waterdrop shape, and as a result, a pointed portion 100d' may be formed at a fourth portion 100d'.

As such, the shape of the air guide unit 100' may be formed in an airfoil shape having one side rounded and the other side pointed. This shape may be advantageous in that it be stacked from the first portion 100a' to the second portion 100b' by using a 3D printing stack manufacturing method.

Also, according to the present embodiment, because the pointed portion 100d'1 is formed at the fourth portion 100d' where a wake may be formed, a wake f' occurring at the fourth portion 100d' may be reduced, and instead, a swirl flow may be generated to remove a high-temperature area in the fourth portion 100d', thereby protecting the air guide unit 100' and the combustor liner 300 in the corresponding portion from a high-temperature flame and securing the durability thereof.

Although the disclosure has been described with reference to embodiments illustrated in the drawings, the embodiments are merely examples. Those of ordinary skill in the art may fully understand that various modifications and other equivalent embodiments may be made from the embodiments. Thus, the true scope of the disclosure should be determined based on the appended claims.

Particular technical contents described in the embodiments are merely examples and do not limit the scope of the disclosure. In order to concisely and clearly describe the embodiments, descriptions of general technologies and configurations of the related art may have been omitted. Connections or connection members of lines between the elements illustrated in the drawings may illustratively represent functional connections and/or physical or logical connections and may be represented as various replaceable or additional functional connections, physical connections, or logical connections in an actual apparatus. Also, no element may be essential to the practice of the disclosure unless the element is particularly described as "essential" or "critical".

In the description and claims, "the" or similar reference words may refer to both the singular and the plural unless otherwise specified. Also, unless otherwise specified herein, recitation of a range of values herein are merely intended to serve as a shorthand method of referring individually to each separate value falling within the range, and each separate value may be incorporated herein as if it was individually recited herein. Also, the operations of the method described herein may be performed in any suitable order unless otherwise specified herein or otherwise clearly contradicted by the context. The embodiments are not limited to the described order of the operations. All examples or illustrative terms (e.g., "such as") used herein are merely intended to describe the technical concept of the disclosure in detail, and the scope of the disclosure is not limited by the examples or illustrative terms unless otherwise defined in the appended claims. Also, those of ordinary skill in the art may understand that various modifications, combinations, and changes may be made according to design conditions and factors within the scope of the appended claims or equivalents thereof.

In the combustor according to the above embodiments, the combustor liner may be more easily manufactured by manufacturing the combustor liner by using the 3D printer stack manufacturing method.

Also, in the combustor according to the embodiments, through the structure of the air guide unit based on the cooling design, the pressure loss of the air introduced into the combustor liner may be minimized and the combustion efficiency of the combustor may be improved.

Effects of the disclosure are not limited to the effects mentioned above, and other unmentioned effects may be clearly understood from the description of the appended claims by those of ordinary skill in the art.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A combustor comprising: a combustor case; a combustor liner which is arranged in the combustor case and into which fuel is injected; and an air guide unit that is hollow and is formed to protrude from an inner surface of the combustor liner to inject air into an inside of the combustor liner, wherein the air guide unit comprises: a first portion forming one end of the air guide unit and coupled to the inner surface of the combustor liner; a second portion forming another end of the air guide unit and disposed in the combustor liner; a third portion arranged at an inlet side of the air guide unit, the third portion extending from the inner surface of the combustor liner to the second portion and an outer wall of the third portion and an inner wall of the third portion, opposite of the outer wall of the third portion, are inclined with respect to the inner surface of the combustor liner; and a fourth portion arranged at an outlet side of the air guide unit, an outer wall of the fourth portion and an inner wall of the fourth portion, opposite of the outer wall of the fourth portion and facing the inner wall of the third portion, extending, perpendicular to the inner surface of the combustor liner, from the inner surface of the combustor liner to the second portion, and wherein a size of the first portion is different from a size of the second portion, wherein a second flow port and a third flow port are arranged in the third portion, and a shape of an opening of the second flow port is different from a shape of an opening of the third flow port, wherein the third flow port is formed in a crescent shape along a circumference of the air guide unit, and wherein the second flow port comprises a plurality of holes at a position closer to the inner surface of the combustor liner than the third flow port.

2. The combustor of claim 1, wherein a fourth flow port is arranged in the fourth portion, and
wherein the fourth flow port is formed as a plurality of holes.

3. The combustor of claim 1, wherein a first flow port is arranged in the second portion.

4. The combustor of claim 1, wherein the air guide unit is configured to inject the air having passed through a deswirler, into the combustor liner.

5. The combustor of claim 1, wherein in the air guide unit, the first portion is formed in an elliptical shape, and the second portion is formed in a circular shape.

6. The combustor of claim 5, wherein in the air guide unit, a long diameter of the first portion is greater than a diameter of the second portion.

7. The combustor of claim 5, wherein a front-most end of the second portion of the air guide unit, in a direction opposite to a main flow direction of a combustion gas in the combustor liner, is farther in the main flow direction than a front-most end of the first portion of the air guide unit in the direction opposite to the main flow direction.

8. The combustor of claim 1, wherein the combustor liner and the air guide unit coupled to the combustor liner are manufactured by stacking combustor liner parts output by a three-dimensional (3D) printer.

9. The combustor of claim 1, wherein the first portion and the second portion are formed in a waterdrop shape, and
wherein a pointed portion is formed in the fourth portion.

10. A combustor comprising: a combustor case; a combustor liner which is arranged in the combustor case and into which fuel is injected; and an air guide unit that is hollow and is formed to protrude from an inner surface of the combustor liner to inject air into an inside of the combustor liner, wherein the air guide unit comprises a lower portion coupled to the inner surface of the combustor liner, and an upper portion disposed in the combustor liner, wherein the air guide unit is arranged such that a longitudinal direction of the air guide unit is inclined by a predetermined angle, that is greater than zero, with respect to a main flow direction of a combustion gas in the combustor liner, wherein the air guide unit further comprises: an inclined portion arranged at an inlet side of the air, the inclined portion extending from the inner surface of the combustor liner to the upper portion, and an outer wall of the inclined portion and an inner wall of the inclined portion, opposite of the outer wall of the inclined portion, are inclined with respect to the inner surface of the combustor liner; and a vertical portion arranged at an outlet side of the air, an outer wall of the vertical portion and an inner wall of the vertical portion, opposite of the outer wall of the vertical portion and facing the inner wall of the inclined portion, extending, perpendicular to the inner surface of the combustor liner, from the inner surface of the combustor liner to the upper portion, wherein a second flow port and a third flow port are arranged in the inclined portion, and a shape of an opening of the second flow port is different from a shape of an opening of the third flow port, wherein the third flow port is formed in a crescent shape along a circumference of the air guide unit, and wherein the second flow port comprises a plurality of holes at a position closer to the inner surface of the combustor liner than the third flow port.

11. The combustor of claim 10, further comprising a vane configured to receive the combustion gas,
wherein a longitudinal direction of the vane is greater than the predetermined angle and smaller than 90°.

12. The combustor of claim 10, wherein the lower portion has a greater internal area than the upper portion.

13. The combustor of claim 10, wherein in the air guide unit, a long diameter of the lower portion is greater than a diameter of the upper portion.

14. The combustor of claim 10, wherein a front-most end of the lower portion of the air guide unit, in a direction opposite to the main flow direction of the combustion gas in the combustor liner, is farther in the main flow direction than a front-most end of the upper portion of the air guide unit in the direction opposite to the main flow direction.

\* \* \* \* \*